(12) United States Patent
Faucher

(10) Patent No.: US 6,792,789 B1
(45) Date of Patent: Sep. 21, 2004

(54) HYDRAULIC TOOL HAVING REMOVABLE CUTTING DIES AND CRIMPING DIES

(75) Inventor: Thomas R. Faucher, Manchester, NH (US)

(73) Assignee: FCI Americas Technology, Inc., Reno, NV (US)

(*) Notice: Subject to any disclaimer, the term of this patent is extended or adjusted under 35 U.S.C. 154(b) by 0 days.

(21) Appl. No.: 10/406,115

(22) Filed: Apr. 3, 2003

(51) Int. Cl.⁷ .............................. B21D 37/06; B21J 13/04
(52) U.S. Cl. ........................ 72/456; 72/409.16; 72/416
(58) Field of Search .............................. 72/409.16, 416, 72/453.16, 456; 30/181, 182, 228, 241; 83/635

(56) References Cited

U.S. PATENT DOCUMENTS

| | | | |
|---|---|---|---|
| 2,711,583 A | 6/1955 | Raby | 30/92 |
| 2,722,859 A | 11/1955 | Stoltz | 81/15 |
| 2,815,646 A | 12/1957 | Swanson | 60/52 |
| 3,152,397 A | 10/1964 | Adam | 30/228 |
| 3,267,573 A | 8/1966 | Hill | 30/228 |
| 3,676,929 A | 7/1972 | Nicholson | 30/228 |
| 3,840,987 A | 10/1974 | Netta | 30/90.1 |
| 3,919,877 A | 11/1975 | Netta | 72/456 |
| 3,995,369 A | 12/1976 | Duff | 30/228 |
| 4,026,028 A | 5/1977 | Green | 30/233 |
| 4,292,833 A | 10/1981 | Lapp | 72/416 |
| 4,779,502 A | 10/1988 | Hebert | 83/635 |
| 4,825,755 A | 5/1989 | Takano | 92/13.6 |
| 5,113,727 A * | 5/1992 | Foster | 81/423 |
| 5,457,889 A | 10/1995 | Kimura | 30/228 |
| 5,649,445 A * | 7/1997 | Lavoie et al. | 72/413 |
| 5,722,170 A | 3/1998 | Smith | 30/228 |
| 6,230,542 B1 | 5/2001 | Frenken | 72/456 |
| 6,276,186 B1 | 8/2001 | Frenken | 72/453.15 |
| 6,532,790 B2 * | 3/2003 | Frenken | 72/456 |

* cited by examiner

*Primary Examiner*—David Jones
(74) *Attorney, Agent, or Firm*—Harrington & Smith, LLP

(57) ABSTRACT

A hydraulic tool including a frame having a working head section; a hydraulic drive system connected to the frame; a cutting die system; and a connector crimping die system. The drive system has a ram proximate the working head section of the frame. The cutting die system includes a first cutting die removably connectable to the working head section of the frame and a second cutting die removably connectable to the ram at the working head section. The cutting dies are always in a slidable interlocking connection with each other when connecting to the working head section. The connector crimping die system includes a first crimping die removably connectable to the working head section of the frame, and a second crimping die removably connected to the ram and coupling the second crimping die to the ram.

19 Claims, 6 Drawing Sheets

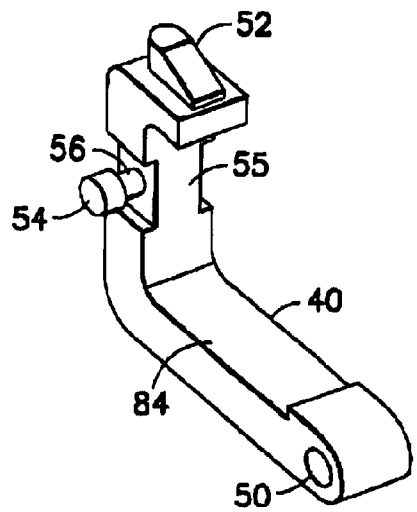
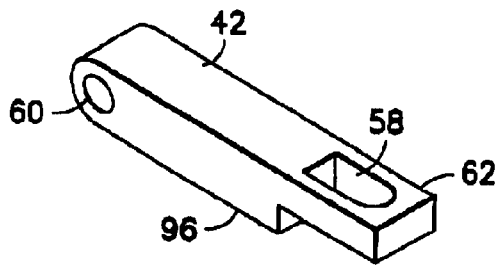
FIG.3
FIG.4
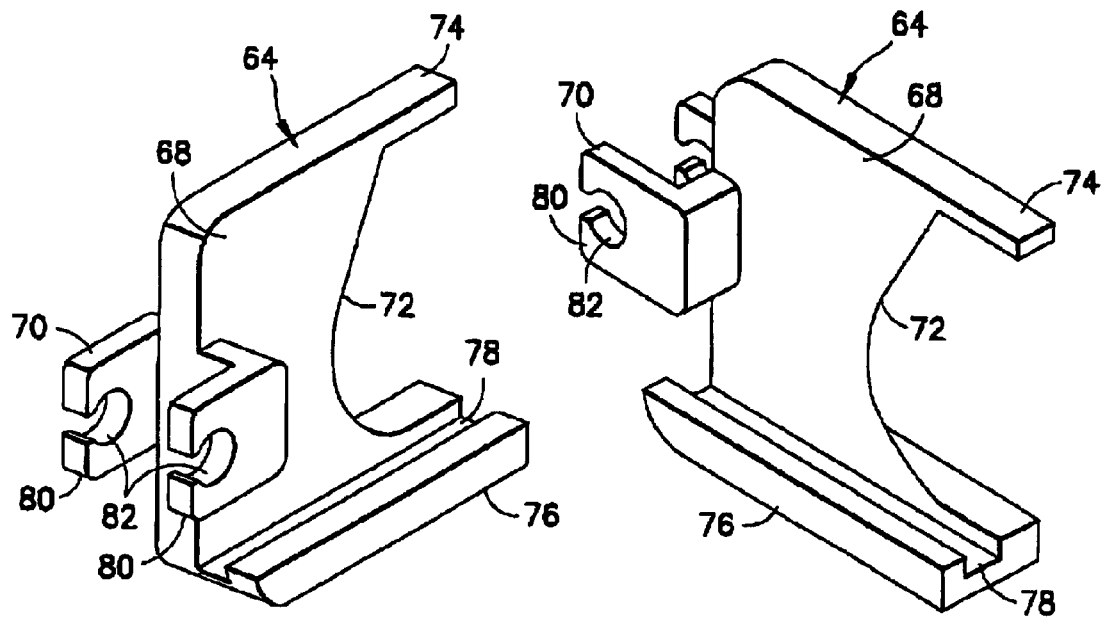
FIG.5
FIG.6

HYDRAULIC TOOL HAVING REMOVABLE CUTTING DIES AND CRIMPING DIES

BACKGROUND OF THE INVENTION

1. Field of the Invention

The present invention relates to hydraulic tools and, more particularly, to a hydraulic tool which can be alternatively configured as a cutting tool or an electrical connector crimping tool.

2. Brief Description of Prior Developments

Hydraulically operated connector crimping tools are generally well known in the art. For example, FCI USA, Inc. sells a battery actuated tool known as the BURNDY® BATOOL™ BAT500™ which is a hand held battery operated hydraulic connector crimping tool which is adapted to removably receive different types of connector crimping dies.

Hydraulically operated wire cutting tools are also generally well known in the art. Prior art tools contain complex grooves or channels in the cutter head for alignment purposes, such as shown in U.S. Pat. No. 6,230,542 B1. There is a desire to be able to exchange crimping dies for cutting dies using the same head frame while ensuring proper alignment for cutting dies without costly geometry.

SUMMARY OF THE INVENTION

In accordance with one aspect of the present invention, a hydraulic tool is provided including a frame having a working head section; a hydraulic drive system connected to the frame; a cutting die system; and a connector crimping die system. The drive system has a ram proximate the working head section of the frame. The cutting die system includes a first cutting die removably connectable to the working head section of the frame and a second cutting die removably connectable to the ram at the working head section. The cutting dies are always in a slidable interlocking connection with each other when connected to the working head section. The connector crimping die system includes a first crimping die removably connectable to the working head section of the frame, a second crimping die, and a crimping die adapter removably connectable to the ram for coupling the second crimping die to the ram.

In accordance with another aspect of the present invention, hydraulic tool cutting dies are provided comprising a first cutting die removably connectable to a frame of the hydraulic tool; a second cutting die removably connectable to a ram of the hydraulic tool; and an interlock system for slidably coupling the first and second dies to each other comprising one of the cutting dies having a groove track and the other cutting die having a guide rail slidably located in the groove track.

In accordance with another aspect of the present invention, a hydraulic tool crimping die system is provided comprising a first adapter adapted to be removably connected to a frame of the hydraulic tool; a first crimping die located in a seat of the first adapter and removably attached to the frame of the hydraulic tool; a second adapter adapted to be removably connected to a ram of the hydraulic tool; and a second crimping die located in a seat of the second adapter and removably attached to the adapter.

BRIEF DESCRIPTION OF THE DRAWINGS

The foregoing aspects and other features of the present invention are explained in the following description, taken in connection with the accompanying drawings, wherein:

FIG. 3 is a perspective view of the yoke used in the working head shown in FIG. 2;

FIG. 4 is a perspective view of the latch used in the working head shown in FIG. 2;

FIG. 5 is a perspective view of the first cutting die used in the working head shown in FIG. 2;

FIG. 6 is a perspective view of the first cutting die shown in FIG. 5;

DETAILED DESCRIPTION OF THE PREFERRED EMBODIMENT

Figure 1:
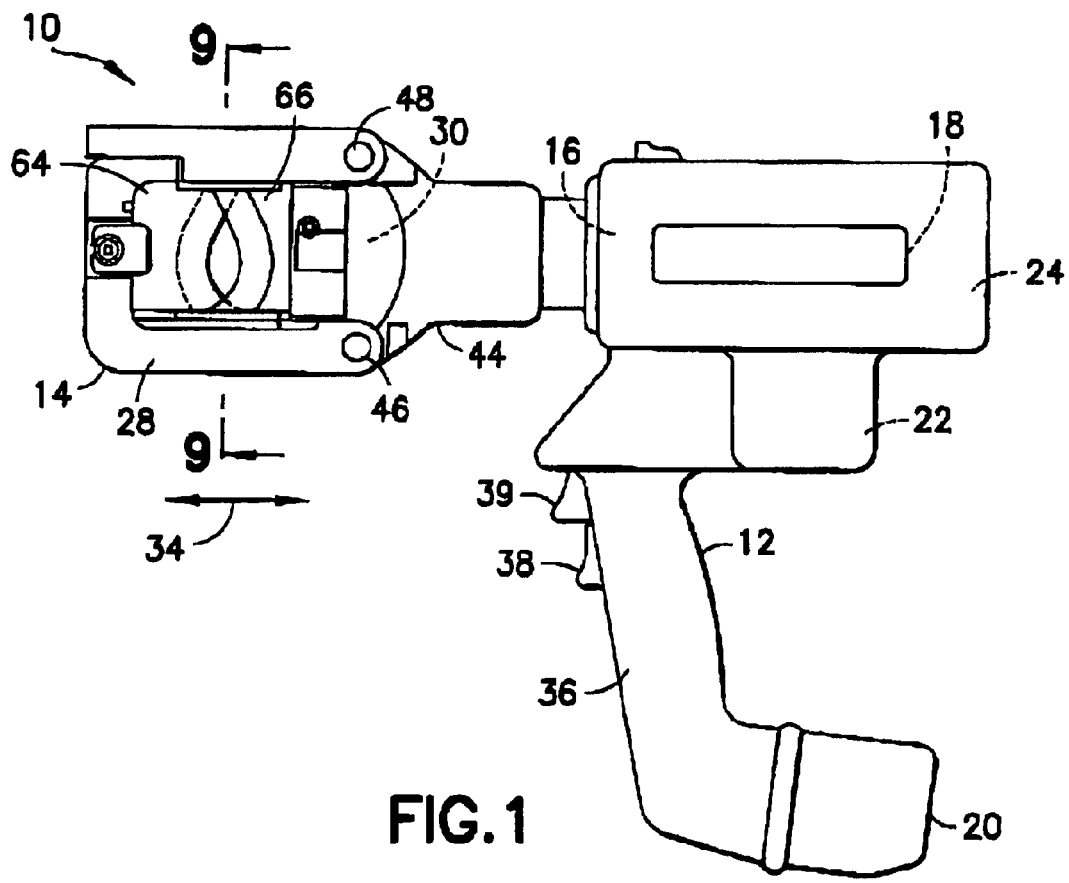
FIG. 1 is a side elevational view of a hydraulic tool incorporating features of the present invention.

Referring to FIG. 1, there is shown a perspective view of a hydraulically operated tool 10 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

In the embodiment shown in FIG. 1, the working head 14 comprises a cutting die system. One of the important features of the present invention is the ability to easily manufacture the cutting die set and providing an alignment feature to maintain alignment between the cutting dies while cutting wire. The present invention provides this feature by providing one of the cutting dies with an alignment groove which a portion of the other cutting die rides along. This interlocking connection maintains alignment between the cutting dies during a cutting operation. However, unlike conventional hydraulically operated cutting tools, the configuration described herein allows for removal of the cutting die system and replacement with a connector crimping die system as described herein. Thus, the present invention can provide a hydraulic tool which allows for use of either a cutting die system or a connector crimping die system, but which also provides an interlocking connection between cutting dies of the cutting die system to maintain alignment during a cutting operation.

Prior art tools, such as described in U.S. Pat No. 6,230,542 B1, contain complex grooves or channels in the tool head for cutting die alignment purposes. There is a desire to be able to exchange crimping dies for cutting dies using the same tool head while ensuring proper alignment for cutting dies without costly head construction. Having to form grooves or channels in a tool head, such as in U.S. Pat. No. 6,230,542 B1, increases the costs of manufacturing the tool head. The type of tool head design in U.S. Pat. No. 6,230,542 B1 also makes the tool head heavier because of the need to increase the thickness of the section which has the cutting die guiding grooves.

The present invention, on the other hand, provides a system with a cutting die set which was created to be easily manufactured and maintain alignment while cutting an article, such as a wire for example. The present invention can comprise a system with a tool head that does not have cutting die guiding grooves, but which can nonetheless allow use of both cutting dies and crimping dies with the tool head. Because the tool head of the present invention does not need cutting die guiding grooves, manufacturing costs for the system of the present invention can be reduced versus a tool head such as disclosed in U.S. Pat. No. 6,230,542 B1. Because the system of the present invention does not need to comprise guiding grooves in its tool head as in U.S. Pat. No. 6,230,542 B1, the tool head of the present invention can be lighter in weight. Furthermore, these cutting dies can be easily removed without tools and replaced with crimp die adapters. The cutting dies are preferably unique in their geometry so they cannot be installed incorrectly, unlike the cutting die in U.S. Pat. No. 6,230,542 B1.

The tool 10 generally comprises a frame 12, a working head 14, a pump 16, a motor 18, a battery 20, a fluid reservoir 22 and a controller 24. In alternate embodiments, the tool could comprise additional or alternative components. The frame 12 forms a ram hydraulic drive conduit system. The working head 14 comprises a working head section 28 of the frame 12 and a ram 30. The frame section 28 is connected to the front end of the frame 12, and is preferably rotatable. The ram 30 is movably connected to the section 28. The ram 30 is adapted to move forward and backward as indicated by arrow 34.

The frame 12 forms a handle 36. The battery 20 is removably connected to the bottom of the handle 36. The battery 20 is preferably a rechargeable battery which can output a voltage of at least 14 volts. The handle 36 includes two user actuatable control triggers 38, 39. The control trigger 38 operably coupled to the controller 24. The control trigger 39 is mechanically connected to the hydraulic drive system.

The motor 18 is coupled to the controller 24 and the battery 20. The controller 24 preferably comprises a printed circuit board. However, in alternate embodiments, any suitable type of controller could be provided. The motor 18 is controlled by the controller 24. The output shaft of the motor 18 is preferably connected to the pump 16 by a gear reduction or gearbox (not shown).

The ram hydraulic drive conduit system is connected between the pump 16 and the rear end of the ram 30. Hydraulic fluid pumped by the pump 16 against the rear end of the ram 30 causes the ram 30 to move forward. The ram 30 is preferably manually retractable.

Referring now also to FIGS. 2–10, the working head section 28 of the frame 12 generally comprises a yoke 40 and a latch 42. As shown in FIG. 1, the yolk 40 and latch 42 are pivotably attached to a frame member 44. Frame member 44 houses the ram 30 therein. A front end of the ram 30 is adapted to extend out an aperture at the front of the frame member 44. The yoke 40 is pivotably attached to the frame member 44 at pivot pin 46. The latch 42 is pivotably attached to the frame member 44 at pivot pin 48.

As seen best in FIG. 3, the yoke 40 generally comprises a mounting end 50 and a latch 52. The yoke 40 has a general J shape. A spring loaded latch 54 is connected to a front end of the yoke 40 at a die mounting section 55. The mounting end 50 is pivotably attached to the frame member 44 by the pivot pin 46. The latch 52 is adapted to be located in a latch receiving area 58 of the latch 42 (see FIGS. 1 and 4). The spring loaded latch 54 is movably connected to the yoke 40. The spring loaded latch 54 comprises an annular groove 56 for allowing the latch 54 to attach to a cutting or crimping die as further described below. The yoke 40 is attached to the metal mount 44 by a steel pin to allow the yoke 40 to rotate when the latch 42 is opened. The yoke 40 has an undercut on its longest leg for polarization of the first cutting die.

As best seen in FIG. 4, the latch 42 comprises a mounting end 60 and a latching end 62. The mounting end 60 is pivotably attached to the frame member 44 by the pivot pin 48. The latching end 62 comprises the latch receiving area 58 which is adapted to receive the latch 52 of the yoke 40. The latch 42 can be pivoted open off of the latch 52, and the yoke 40 pivoted relative to the frame member 44, to allow different types of dies to be loaded and unloaded from the working head 14. The latch 42 is a structural member used to lock the yoke 40 in place prior to crimping and cutting operations. The latch 42 is attached to the head mount by a steel pin to allow the latch 42 to rotate when opened. The latch 42 has a cutout designed to receive a boss or latch on the yoke to positively lock them closed for the cutting and crimping operations.

The cutting die system generally comprises a first cutting die 64 and a second cutting die 66. As best seen in FIGS. 5 and 6, the first cutting die 64 generally comprises a main body 68 and a mounting section 70. The main body forms a cutting edge 72, a top support 74 and a bottom support 76. The bottom support 76 includes a groove track 78 on a top side thereof. The groove track 78 is located in an off center location along the length of the bottom support 76. When the latch 42 is attached to the yoke 40, the yoke 40 and inner side 96 of the latch 42 provide support for the top support 74.

The mounting section 70 comprises two legs 80. The first cutting die 66 attaches to the front portion 55 of the yoke with the alignment legs 80. Each of the legs 80 comprise a mounting aperture 82. The first cutting die 66 is held in place by a movable die pin that engages the through holes on the alignment legs. The two legs 80 are spaced from each other to form a receiving area therebetween. Receiving area is sized and shaped to receive a portion 55 of the yoke 40 at the latch 54 therebetween. The apertures 82 are sized and shaped to receive enlarged portions of the latch 54 therein. The annular groove 56 of the latch 54 is sized and shaped to allow one of the legs 80 to pass thereby at the open end slot of one of the apertures 82.

When the first cutting die 64 is attached to the yoke 40 the bottom support 76 rests against the flat surface 84 of the yoke 40. The first cutting die 64 is fixedly attached to the yoke 40 in a stationary position.

However, the first cutting die 64 can be removed from the yoke 40 by movement of the spring loaded latch 54 and subsequent disengagement of the die 64 from the latch 54 and movement of the mounting section 70 off of the die mounting section 55. The legs of the first cutting die are used to hold the first cutting die laterally.

Figure 7:
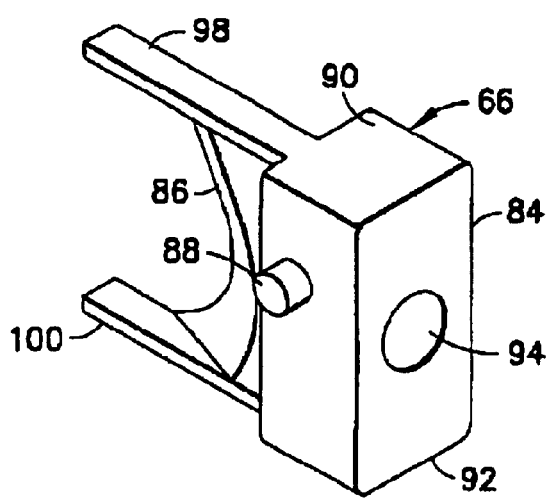
FIG. 7 is a perspective view of the second cutting die used in the working head shown in FIG. 2.
Figure 8:
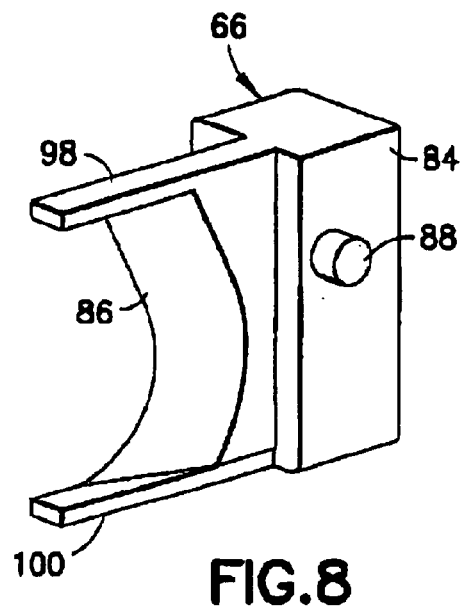
FIG. 8 is a perspective view of the second cutting die shown in FIG. 7.

As seen best in FIGS. 7 and 8, the second cutting die 66 generally comprises a body section 84 and a blade section 86. The second cutting die 66 attaches to the ram piston of the tool 10. The second cutting die 66 also comprises a spring loaded latch 88 connected to the body section 84. The body section 84 comprises flat top and bottom surfaces 90, 92 and a rear end aperture 94. The flat bottom surface 92 is adapted to slide against the flat inner surface 84 of the yoke 40. The body section 84 includes a top rail 98 and a bottom rail 100 located at top and bottom sides of the blade section 86. The top rail 98 is adapted to slide against the inner surface 96 of the latch 42 adjacent a lateral side of the top support 74 of the first die 64.

Figure 9:
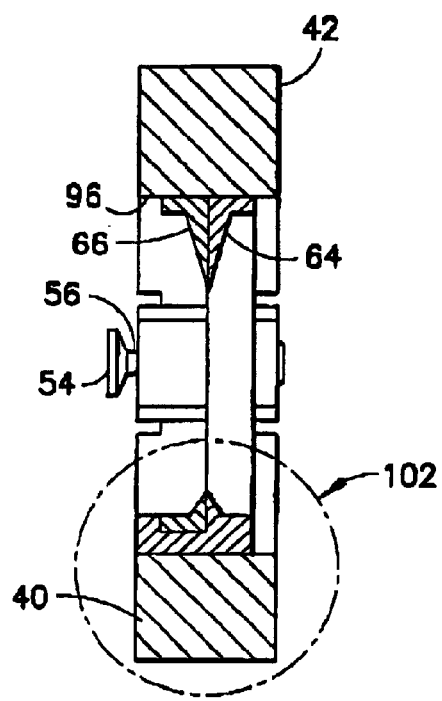
FIG. 9 is a cross sectional view of the working head shown in FIG. 1 taken along line 9—9.
Figure 10:
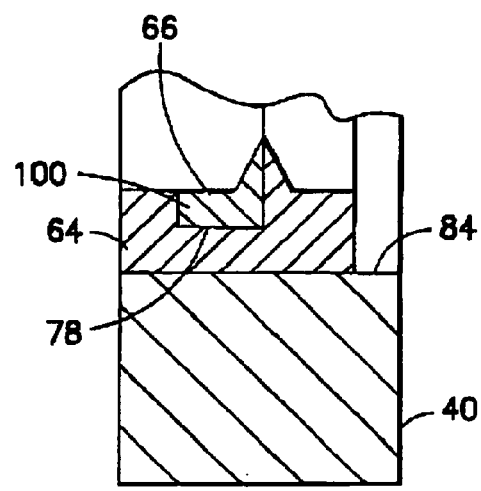
FIG. 10 is an enlarged view of an area 102 shown in FIG. 9.

Referring also to FIGS. 9 and 10, the bottom rail 100 is sized and shaped to be received in the groove track 78 of the first die 64. FIG. 10 is an enlarged view of area 102 shown in FIG. 9. The bottom rail 100 is located off-center of the body section 84 to align with the groove track 78. The bottom rail 100 is adapted to slide in the groove track 78. The groove track 78 and bottom rail 100 form a slidable interlocking connection. The second die 66 can be pushed forward by the ram 30 to move the cutting edge of the blade section 86 towards the cutting edge 72 of the first die 64.

Figure 17:
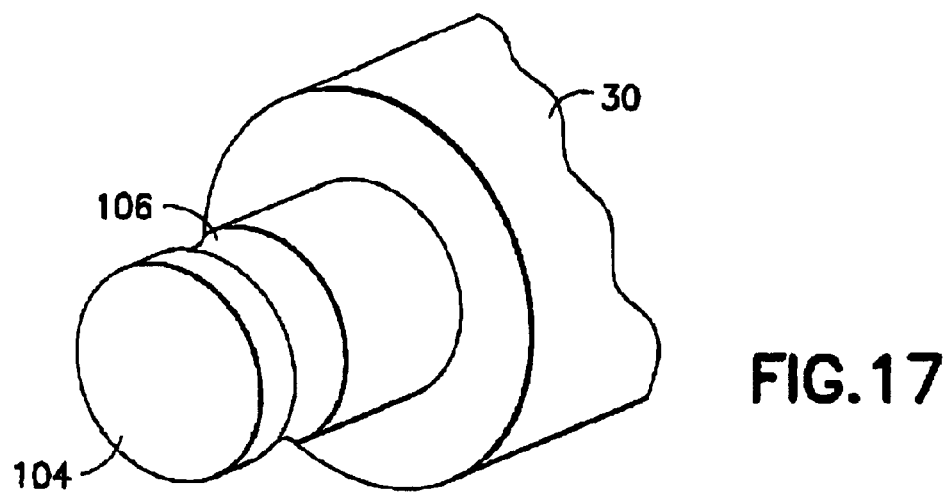
FIG. 17 is a perspective view of the front end of the ram of the tool shown in FIG. 1.
Figure 2:
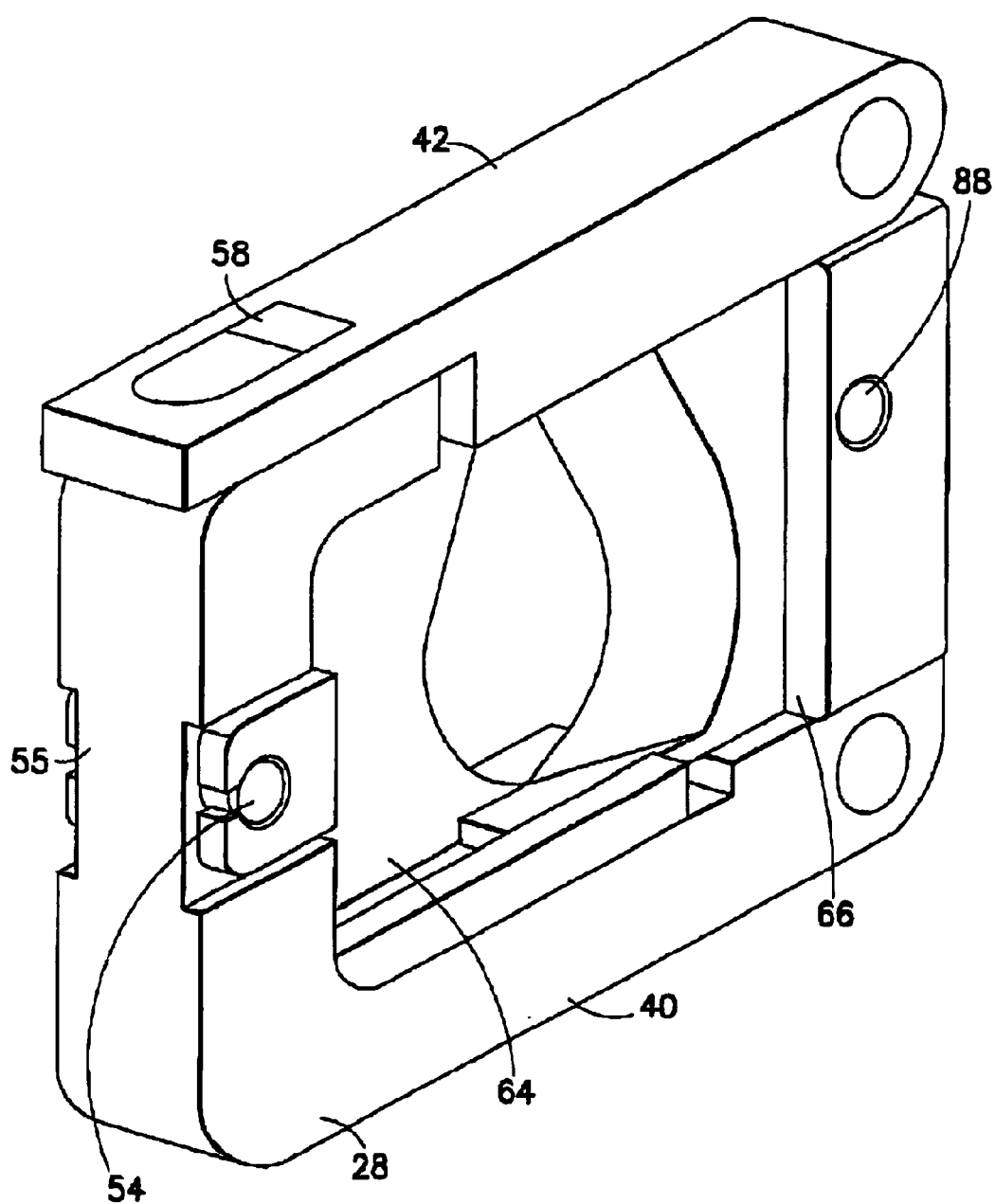
FIG. 2 is a perspective view of components of the working head of the hydraulic tool shown in FIG. 1.

Referring also to FIG. 17, a perspective view of the front end 104 of the ram 30 is shown. The rear end aperture 94 is sized and shaped to receive the front end 104 of the ram 30. The front end 104 of the ram 30 comprises an annular groove 106. The spring loaded latch 88 has a portion which is adapted to be moved into and out of the annular groove 106. When the portion is located in the annular groove 106 the latch 88 retains the second cutting die 66 to the front end 104 of the ram 30. When the portion is moved out of the annular groove 106 the second cutting die 66 can be removed from connection with the ram 30. Thus, the second cutting die 66 can be removably connected to the ram 30. The second cutting die 66 can be easily removed without the use of a tool by a user merely depressing the pushpin of the latch 88.

One of the features of the present invention is the interlocking, guiding nature directly between the two cutting dies. The cutting dies themselves guide each other without the mounting head section 28 of the frame having any groove/guiding capability. This makes the mounting head section less expensive to manufacture and, more importantly, more easily adaptable for use of standard conventional conductor crimping dies with the use of the adapters. The two cutting dies hold each other in place since the first cutting die has a channel to lock-in (restrain lateral movement) the second cutting die during a cutting operation.

As mentioned above, the present invention can provide a hydraulic tool which allows for use of either a cutting die system or a connector crimping die system, but which also provides an interlocking connection between cutting dies of the cutting die system to maintain alignment during a cutting operation. Referring now also to FIGS. 11–16 one exemplary embodiment of a connector crimping die system for use with the tool 10 shown in FIG. 1 will be described.

Figure 11:
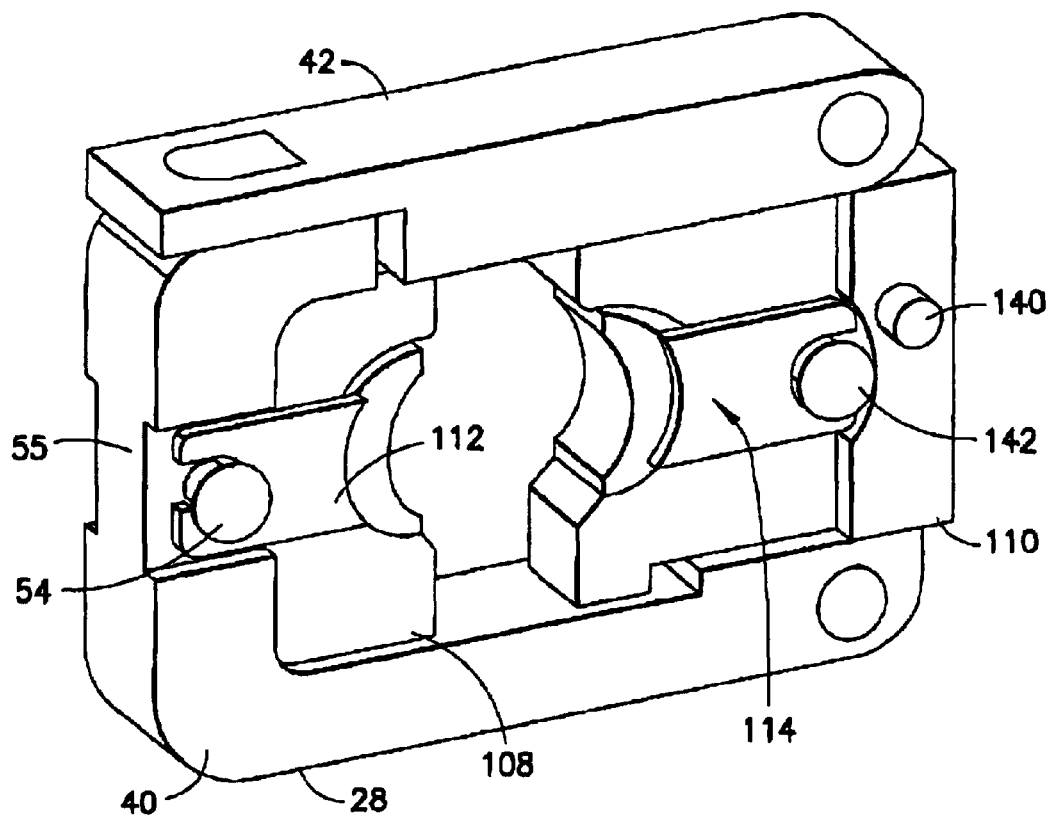
FIG. 11 is a perspective view of an alternate embodiment of the working head of the tool shown in FIG. 1.
Figure 12:
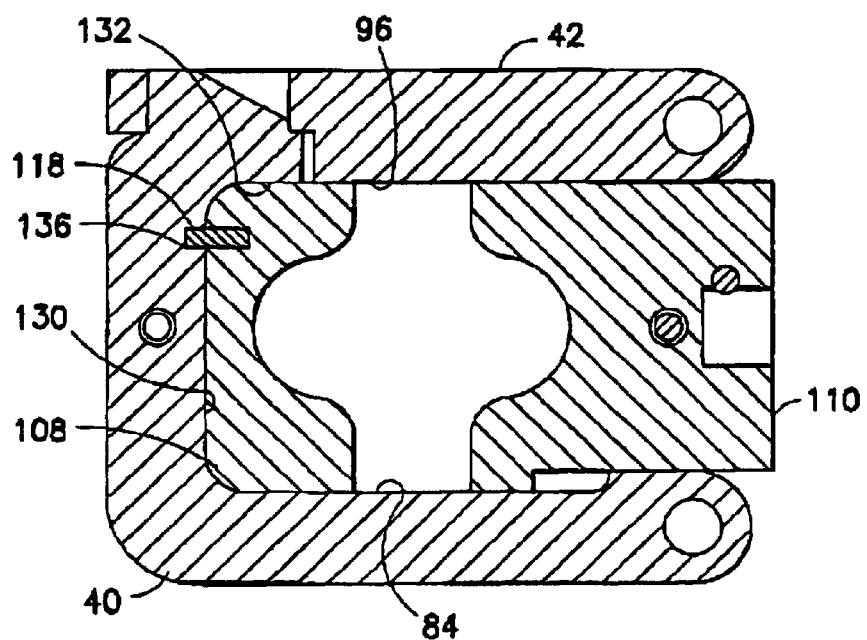
FIG. 12 is a cross sectional view the working head shown in FIG. 11 without the connector crimping dies attached to the working head.

In the embodiment shown in FIG. 11 the working head comprises the working head section 28 of the frame 12, two adapters 108, 110, and two connector crimping dies 112, 114. The two connector crimping dies 112, 114 are generally well known in the art. The first adapter 108 is sized and shaped to allow the first crimping die 112 to be attached to the die mounting section 55 of the yoke 40 and the spring loaded latch 54 with the first adapter 108 providing structural support for the first crimping die 112 during a connector crimping operation.

Figure 13:
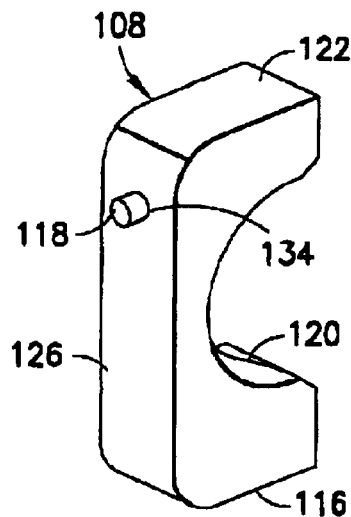
FIG. 13 is a perspective view of the first adapter used in the working head shown in FIG. 11.
Figure 14:
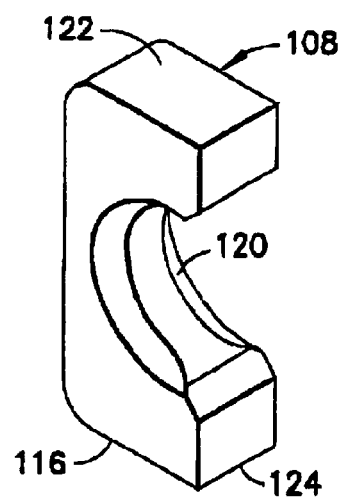
FIG. 14 is a perspective view of the first adapter shown in FIG. 13.

Referring particularly to FIGS. 13 and 14, the first adapter 108 generally comprises a first member 116 and a second member 118. The first member 116 is preferably comprised of metal and comprises a crimping die seat 120, a top support surface 122, a bottom support surface 124, and a rear support surface 126. The first-member 116 is sized and shaped such that the rear support surface 126 can be located against the surface 130 of the yoke 40, the bottom support surface 124 can be located against the surface 84 of the yoke 40, and the top support surface 122 can be located against the surface 132 of the yoke 40 and the surface 96 of the latch 42. The rear support surface 126 includes an aperture 134.

The second member 118 is fixedly mounted in the aperture 134, such as by a press fit insertion. The second member 118 is preferably comprised of magnetic material. The yoke 40 comprises an aperture 136 in the surface 130. The second member 118 is adapted to fit in the aperture 136 to assist in connecting the adapter 108 to the yoke 40. More specifically, the second member 118 functions as a connector to magnetically attach the adapter 108 to the yoke 40. The magnetic coupling of the adapter:108 to the yoke 40 can be relatively easily overcome by a user, but prevents the adapter 108 from being disengaged from the yoke 40 accidentally while the connector crimping die 112 is being replaced with another type of connector crimping die.

Figure 15:
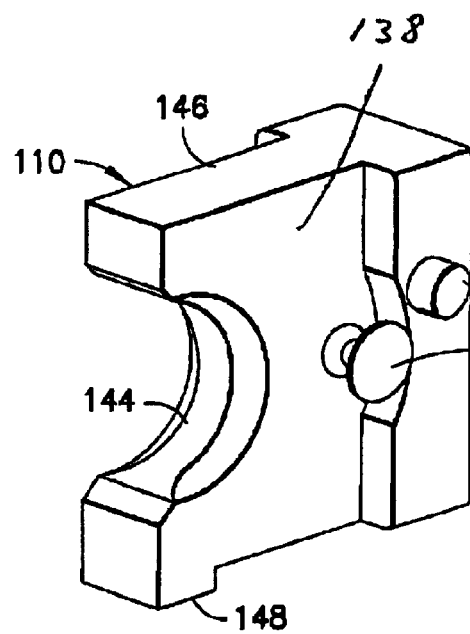
FIG. 15 is a perspective view of the second adapter used in the working head shown in FIG. 11.
Figure 16:
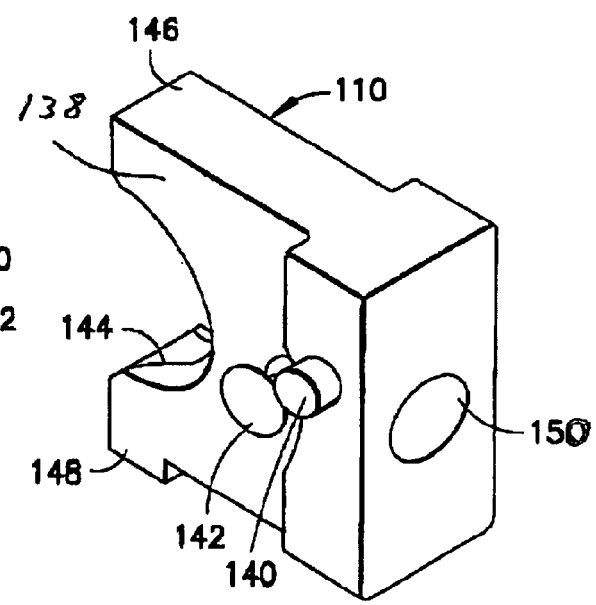
FIG. 16 is a perspective view of the second adapter shown in FIG. 15.

Referring particularly to FIGS. 15 and 16, the second adapter 110 generally comprises a first member 138, a first spring loaded latch 140 and a second spring loaded latch 142. The first member 138 generally comprises a one-piece member comprised of metal. The first member 138 includes a crimping die seat 144, a top support surface 146, a bottom support surface 148, and a rear end aperture 150. The first member 138 is sized and shaped such the bottom support surface 148 can be slidably located against the surface 84 of the yoke 40, and the top support surface 146 can be slidably located against the surface 96 of the latch 42.

The rear end aperture 150 is sized and shaped to receive the front end 104 of the ram 30 (see FIG. 17). The first spring loaded latch 140 is substantially identical to the spring loaded latch 88 used with the second cutting die 66 shown in FIGS. 7 and 8. The first spring loaded latch 140 has a portion which is adapted to be moved into and out of the annular groove 106. When the portion is located in the annular groove 106 the latch 140 retains the second adapter 110 to the front end 104 of the ram 30. When the portion is moved out of the annular groove 106 the second adapter 110 can be removed from connection with the ram 30. Thus, the second adapter can be removably connected to the ram 30.

The second spring loaded latch 142 is substantially identical to the spring loaded latch 54 on the die mounting section 55 of the yoke 40. The second spring loaded latch 142 and the first member 138 are sized and shaped to removably attach the second connector crimping die 114 to the second adapter 110. This allows different types of connector crimping dies to be removably attached to the second adapter 110.

In alternate embodiments, the frame 12 could comprise any suitable type of shape. In addition, the battery 20 could be removably mounted to any suitable position on the frame. The battery 20 might also be fixedly mounted to the tool and not be removable. In alternate embodiments, any suitable type of user actuatable controls could be provided. The tool 10 could also comprise a spring (not shown) which is adapted, as is known in the art, to return the ram 30 to its rearward home position when hydraulic fluid pressure is released. In an alternate embodiment, the yoke and latch could comprise any suitable type of shapes. In addition, any suitable type of structure for the working head section of the frame could be provided to allow loading and unloading of different types of dies with the working head section of the frame.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A hydraulic tool comprising:
    a frame having a working head section;
    a hydraulic drive system connected to the frame, the drive system having a ram proximate the working head section of the frame;
    a cutting die system comprising a first cutting die removably connectable to the working head section of the frame and a second cutting die removably connectable to the ram at the working head section, wherein the cutting dies are always in a slidable, direct interlocking connection with each other when connected to the working head section; and
    a connector crimping die system comprising a first crimping die removably connectable to the working head section of the frame, and a second crimping die removably connectable to the ram and coupling the second crimping die to the ram.

2. A hydraulic tool as in claim 1 wherein the slidable interlocking connection comprises one of the cutting dies having a groove track and the other cutting die having a guide rail slidably located in the groove track.

3. A hydraulic tool as in claim 2 wherein the first cutting die comprises the groove track and further comprises legs with mounting apertures, the legs being spaced from each other to form a receiving area for receiving a portion of the working head section of the frame therein.

4. A hydraulic tool as in claim 3 wherein the second cutting die comprises a body section and a blade section, wherein the blade section extends from the body section in an off center position and the groove track in the first cutting die is in an off center position such that a polarizing feature is provided to allow the second cutting die to be mounted to the ram and the first cutting die in only one position.

5. A hydraulic tool as in claim 1 wherein the second cutting die comprises a rear end aperture adapted for receiving a front end of the ram.

6. A hydraulic tool as in claim 5 wherein the second cutting die comprises a spring loaded latch extending into the rear end aperture for interlocking engagement with the front end of the ram.

7. A hydraulic tool as in claim 1 wherein the adapter comprises a movable latch for engaging the second crimping die.

8. A hydraulic tool as in claim 7 wherein the second crimping die comprises spaced legs having apertures therein, and wherein the movable latch is adapted to move in the apertures of the spaced legs.

9. A hydraulic tool as in claim 1 further comprising a crimping die adapter removably connectable to the ram and adapted to couple the second crimping die to the ram, wherein the adapter comprises a rear end aperture adapted for receiving a front end of the ram.

10. A hydraulic tool as in claim 9 wherein the adapter comprises a spring loaded latch extending into the rear end aperture for interlocking engagement with the front end of the ram.

11. A hydraulic tool as in claim 1 wherein the connector crimping die system further comprises a first crimping die adapter removably connected to the frame at the working head section.

12. A hydraulic tool as in claim 11 wherein the connector crimping die system further comprises a magnet for magnetically coupling the first adapter to the frame at the working head section.

13. Hydraulic tool cutting dies comprising:
    a first cutting die removably connectable to a frame of the hydraulic tool;
    a second cutting die removably connectable to a ram of the hydraulic tool; and
    an interlock system for slidably coupling the first and second dies to each other comprising one of the cutting dies having a groove track and the other cutting die having a guide rail slidable located in the groove track,
    wherein a working head section of the hydraulic tool does not have a guiding groove.

14. Hydraulic tool cutting dies as in claim 13 wherein the first cutting die comprises the groove track and further comprises legs with mounting apertures, the legs being spaced from each other to form a receiving area for receiving a portion of a working head section of the hydraulic tool frame therein.

15. A hydraulic tool as in claim 14 wherein the second cutting die comprises a body section and a blade section, wherein the blade section extends from the body section in an off center position and the groove track in the first cutting die is in an off center position such that a polarizing feature is provided to allow the second cutting die to be mounted to the ram and the first cutting die in only one position.

16. A hydraulic tool as in claim 13 wherein the second cutting die comprises a rear end aperture adapted for receiving a front end of the ram.

17. A hydraulic tool as in claim 16 wherein the second cutting die comprises a spring loaded latch extending into the rear end aperture for interlocking engagement with the front end of the ram.

18. A hydraulic tool crimping die system comprising:
    a first adapter adapted to be removably connected to a working head of the hydraulic tool;
    a first crimping die adapted to be located in a seat of the first adapter and removably attachable to the working head of the hydraulic tool;
    a second adapter adapted to be removably connected to a ram of the hydraulic tool; and
    a second crimping die adapted to be located in a seat of the second adapter and removably attachable to the adapter,
    wherein the second adapter comprises a rear end aperture and a spring loaded latch extending into the rear end aperture for interlocking engagement with a front end of the ram,
    wherein the first crimping die and the second crimping die are removably connectable to the working head section of the hydraulic tool, which does not have a guiding groove.

19. A hydraulic tool as in claim 18 further comprising a magnetic alignment pin for magnetically coupling and polarizing the first adapter to the frame of the hydraulic tool.

* * * * *